UNITED STATES PATENT OFFICE.

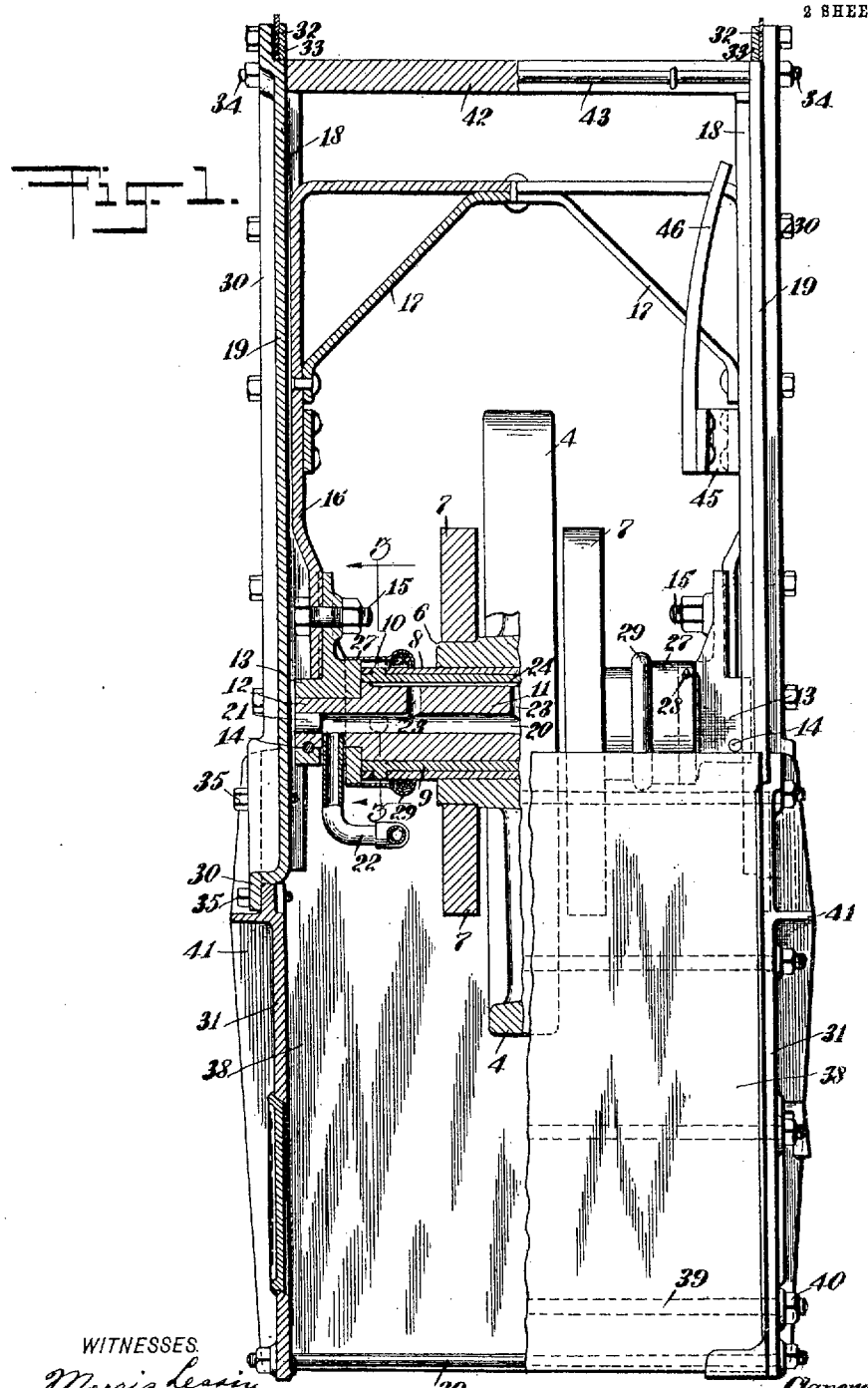

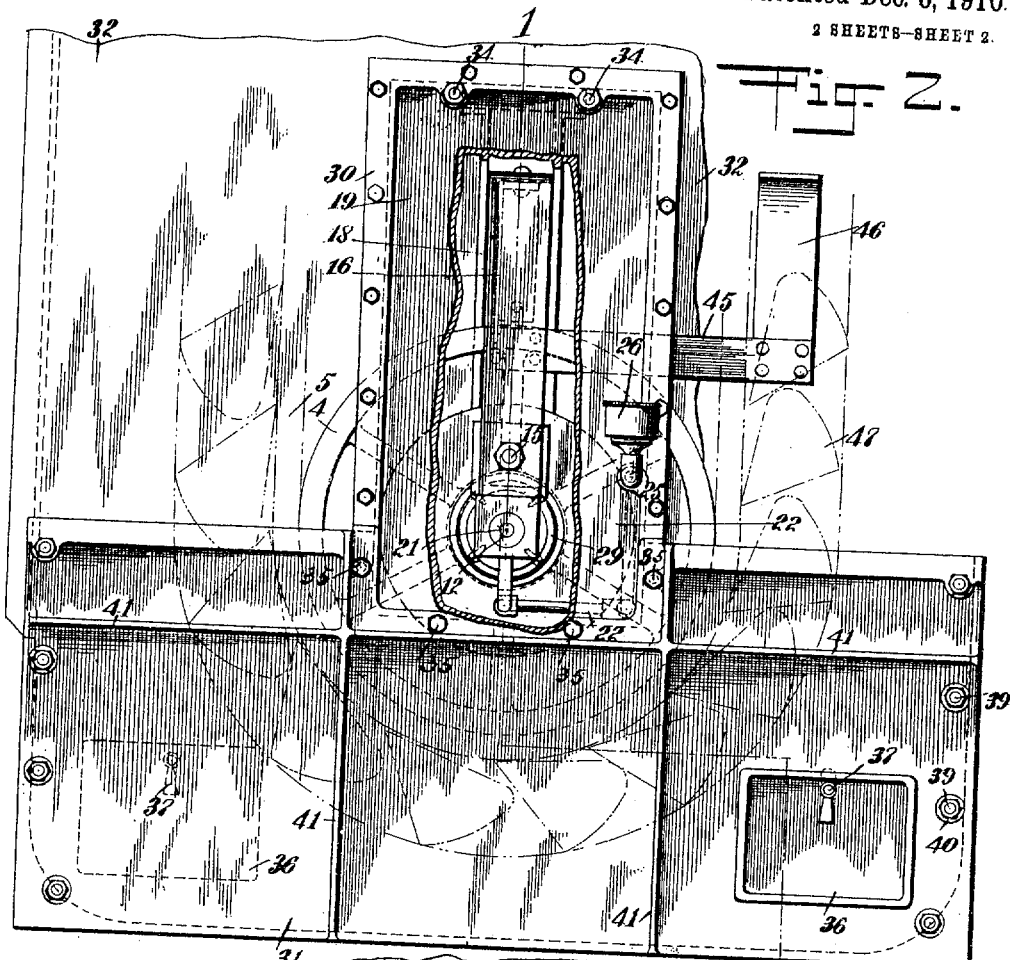
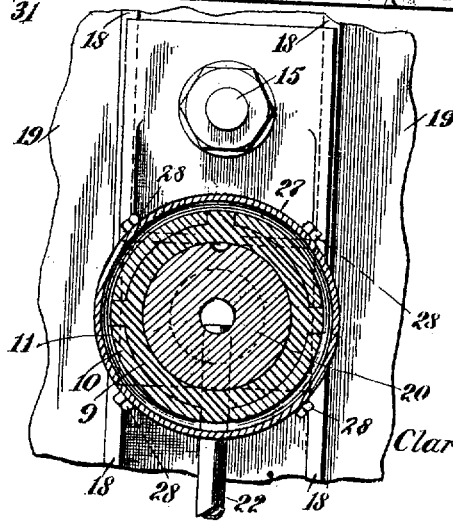

CLARENCE W. UTZMAN, OF OAKFIELD, NEW YORK.

ELEVATOR-BOOT.

977,908.  Specification of Letters Patent.  Patented Dec. 6, 1910.

Application filed July 20, 1909. Serial No. 508,555.

*To all whom it may concern:*

Be it known that I, CLARENCE W. UTZMAN, a citizen of the United States, and a resident of Oakfield, in the county of Genesee and State of New York, have invented a new and Improved Elevator-Boot, of which the following is a full, clear, and exact description.

Among the principal objects which the present invention has in view are: to provide a construction whereby the elevator belt or chain is tightened without increasing friction or wear on bearings in boot; to provide a construction whereby the wear incident to the operation is received upon a removable part or element of the construction; to provide a construction whereby lubricant is provided and fed to the operating shaft from the outside of the casing in such manner as to produce a positive feed of the lubricant, and to maintain the said lubricant in a dust-proof receptacle; to provide a construction wherein the operating parts may be contained within a protecting casing in which provision is made for inspection of and alteration of the contained construction; and to provide a construction wherein the elevator buckets or elements are guided in their relation to the operating wheels.

One embodiment of the present invention is disclosed in the structure illustrated in the accompanying drawings in which like characters of reference denote corresponding parts in all the views.

Figure 1 is a front elevation partly in section, the section being taken on the line 1—1 in Fig. 2, of the elevator boot and the operating mechanism provided at the lower end of the elevator shaft and mounted in said boot; Fig. 2 is a side elevation of the elevator boot shown in conjunction with a fragment of the elevator casing or leg; and Fig. 3 is a section of the rotary shaft mounting for the traveling belt and wheel, the section being taken on the line 3—3 in Fig. 1.

The present drawings show a single chain elevator. The mechanism may be adapted to receive more than one chain or belt or other elevating medium by widening the boot and lengthening the shaft and sleeve.

The boot is shown in conjunction with a driven pulley 4 of a type adapted to properly receive a flexible elevating medium chain, or belt 5. The pulley 4 is provided with a heavy hub 6, which is extended laterally to receive heavy disks 7, which are removably mounted upon the said pulley. These disks or auxiliary weights 7 may be also mounted upon the sleeve 8, or incorporated with pulley 4, and are provided to give additional weight to the pulley to maintain the belt 5 taut under all conditions. The hub 6 is fixedly mounted upon a sleeve 8. This sleeve 8 is constructed from any suitable material, the interior of which is lined with a bearing metal, and rotates upon the shaft 11. The shaft 11 is provided with reduced extensions 12, 12, at each end thereof to rest within perforations formed in blocks 13, 13, provided therefor. The extensions 12, 12, are fixedly mounted in the said blocks 13, 13, and maintained therein by pins 14, 14, driven through the said blocks and passing through grooves provided in the side of the said extensions.

The blocks 13, 13, are secured by bolts 15, 15, to the lower ends of a yoke 16. The yoke 16 is suitably braced by a thrust bar 17, and is mounted in grooves formed by flanges 18, 18, set vertically in the side plates 19, 19. The grooves formed by the flanges 18, 18, guide the yoke 16, and the blocks 13, 13, in the rise and fall of the shaft 11, and the operating elements connected therewith. This rise and fall is usually due to the stretching or wear in the elevating medium forming the elevator in conjunction with the buckets or other elevating devices carried thereon.

The shaft 11 is bored to form a longitudinal perforation 20, which is closed by suitable plugs 21, these being driven or screw threaded as preferred. Introduced from the outside into the perforation 20 is an inlet pipe 22. Extending from the perforation 20 outward are perforations 23 which lead to the upper side of the shaft 11, and to a groove 24, which lubricates the inner surface of the sleeve 8. The inlet pipe 22 is suitably arranged within the boot and extended upward above the shaft 11 and through the side wall of the boot to receive a coupling 25, upon which is mounted an oil or grease cup 26. By placing the oil cup 26 above the shaft 11 the lubricant is delivered to the perforation 20 under pressure. This insures a constant and steady feed for the lubricant to the running channel between the sleeve 8 and the shaft 11.

The inner face of the block 13 is rounded to form a circular seat for the cylindrical dust guard 27. This is fixedly mounted upon the block 13 by set screws 28. At the outer edge the dust guard 27 is provided with a groove 29 adapted to receive a suitable packing to prevent the admission of dust or grit.

The side plates 19, 19, are provided with suitable bolting flanges, 30, 30, by which they are secured to the lower side plates 31, 31, and the elevator casing 32 and reinforcing 33 therefor, which is provided where the side plates 19, 19, and 30, 30, are bolted to the lighter metal forming the sides of the elevator shaft. The side plates 19, 19 are removable, being secured in position on the casing 32 by bolts 35, 34 and to the lower side plates by bolts 35, 35. By removing either of the side plates it will be seen that the operating parts are accessible for repair, removal or replacement.

In the lower and preferably opposite corners of the lower side plates 31, 31 are provided the inspection doors 36, 36. These are secured in locked position by means of latches 37, 37. The side plates 31, 31 are held in relative position by end plates 38, 38 and cross tie rods 39, 39. The tie rods 39, 39 are provided with screw nuts 40, 40, which, when tightened on the rods, draw the same to seat the side plates 31, 31 rigidly in position upon the end plates 38, 38. The lower side plates 31, 31 are provided with strengthening ribs 41, 41.

At the upper end of the side plates 19, 19 is provided a fender plate 42, which is extended between the plates 19, 19 and clamped in position by the tie rods 43, 43. The tie rods 43, 43 are held in position and tightened by screw nuts 34, 34. The fender 42 is sufficiently wide to protect the operating elements connected with the shaft 11 directly below the said plates.

Fixedly mounted on the yoke 16 and extended laterally therefrom are the braces 45, 45, on the outer end of which are fixedly mounted inwardly converging guides 46, 46. These guides 46, 46 are extended to bear against the sides of the buckets 47, 47 as the same are brought downward to pass onto the surface of the pulley 4. By this means the adjustment of the elevator belt upon the pulley 4 is maintained.

In an apparatus constructed as illustrated and described the operation is as follows: The belt 5 carrying the bucket 47 is threaded around the pulley 4, the yoke 16 being raised to permit the belt to pass under the pulley. The belt being adjusted, the yoke is released, permitting the full weight of the pulley 4, disks 7, 7 and various instrumentalities mounted upon the shaft 11, to rest upon the said belt and by the weight thereof maintain the same in a tightened position.

The flanges 18, 18 forming a groove for the guidance of the yoke 16 permits the latter, and the various parts connected therewith, to rise and fall in the guide formed by the said flanges. This allows for the adjustment of the pulley and parts connected therewith, and to accommodate the requirements of the said belt, chain, or other elevating medium.

By removing the side plates 19, 19, any needed repair or alteration of the mechanism may be effected. By opening the doors 36, 36 any needed inspection may be made and a clearance of the boot from any obstructing material may be effected.

By means of the lubricating plugs illustrated and described, whereby the oil cup 26 is carried above the shaft 11, a constant and even forced feed of the lubricant is obtained.

Having thus described my invention, what I claim as new and desire to secure by Letters Patent is:

1. An elevator boot, comprising side plates oppositely disposed, having vertically arranged guides on the inner side thereof, said plates being removable from the structural frame; cross braces extended between said plates and fixedly secured thereto, said braces adapted to maintain the relative disposition of said plates; a pulley slidably mounted in said guides; a flexible elevating medium adapted to support the said pulley; and auxiliary weight disks removably mounted on the structure of said pulley.

2. An elevator boot, comprising side plates embodying lower sections detachably connected and upper sections being provided with guides extended within the boot and having a cross fender brace adapted to form a shed for falling material to protect the mechanism below said cross brace, a pulley rotatably mounted on a suitable shaft to receive a flexible elevating medium to guide the same at the lower extension thereof, removable weight members carried by said pulley, extensions provided in said shaft to engage the said guides to be controlled thereby, and a yoke attached to said extensions and guidably mounted in said upper sections of said boot.

3. An elevator boot, comprising side plates oppositely disposed, having vertically arranged guides on the inner side thereof, said plates being removable from the structural frame; cross braces extended between said plates and fixedly secured thereto, said braces adapted to maintain the relative disposition of said plates; a pulley slidably mounted in said guides; a flexible elevating medium adapted to support the said pulley; auxiliary removable weight disks mounted on the structure of said pulley; and fixedly disposed inwardly deflecting guides for maintaining in guided position upon the said pulley the said elevating medium, said guides being disposed above the said pulley.

In testimony whereof I have signed my name to this specification in the presence of two subscribing witnesses.

CLARENCE W. UTZMAN.

Witnesses:
M. J. MOROWSKI,
OTTO KUEHNE.